United States Patent
Wade

(10) Patent No.: US 9,710,039 B2
(45) Date of Patent: *Jul. 18, 2017

(54) CALCULATING EXPECTED MAXIMUM CPU POWER AVAILABLE FOR USE

(71) Applicant: International Business Machines Corporation, Armonk, NY (US)

(72) Inventor: Brian K. Wade, Apalachin, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 498 days.

This patent is subject to a terminal disclaimer.

(21) Appl. No.: 14/334,284

(22) Filed: Jul. 17, 2014

(65) Prior Publication Data

US 2016/0019099 A1    Jan. 21, 2016

(51) Int. Cl.
| | |
|---|---|
| G06F 1/28 | (2006.01) |
| G06F 9/50 | (2006.01) |
| G06F 1/26 | (2006.01) |
| G06F 1/32 | (2006.01) |

(52) U.S. Cl.
CPC ............... *G06F 1/28* (2013.01); *G06F 1/266* (2013.01); *G06F 1/3206* (2013.01); *G06F 9/5094* (2013.01)

(58) Field of Classification Search
CPC .. G06F 9/5077; G06F 9/5094; G06F 9/45558; G06F 1/28; G06F 1/266; G06F 1/3206
See application file for complete search history.

(56) References Cited

U.S. PATENT DOCUMENTS

| | | | |
|---|---|---|---|
| 7,613,897 B2 * | 11/2009 | Armstrong ............ | G06F 9/4881 711/173 |
| 7,685,283 B2 | 3/2010 | Boyce, Jr. et al. | |
| 7,748,005 B2 * | 6/2010 | Romero ................ | G06F 9/5061 709/226 |

(Continued)

OTHER PUBLICATIONS

List of IBM Patents or Patent Applications Treated as Related; (Appendix P), Filed Jul. 17, 2014; 2 pages.

(Continued)

*Primary Examiner* — Benjamin Wu
(74) *Attorney, Agent, or Firm* — Cantor Colburn LLP; William A. Kinnaman, Jr.

(57) ABSTRACT

A method of calculating a processing power available from a supervisor of a multi-programmed computing system by a first partition of a plurality of partitions, the method comprising collecting, by the first partition, state data from the supervisor, the state data including a processing capacity of the multi-programmed computing system. The method further comprises initializing a remaining capacity variable to the processing capacity of the multi-programmed computing system; initializing variables, including setting a binary variable to a first logic value for each of the plurality of partitions; iteratively computing an entitlement and amount of power to award for each of the plurality of partitions having their respective binary variables set to the first logic value; and requesting the processing power from the supervisor, based on the iterative computation.

18 Claims, 3 Drawing Sheets

(56) References Cited

U.S. PATENT DOCUMENTS

| | | | | |
|---|---|---|---|---|
| 8,051,420 B2* | 11/2011 | Rolia | ............... | G06F 9/5027 |
| | | | | 718/104 |
| 8,230,434 B2* | 7/2012 | Armstrong | ............ | G06F 9/5077 |
| | | | | 713/1 |
| 8,250,581 B1 | 8/2012 | Blanding | | |
| 8,302,102 B2* | 10/2012 | Anand | ............... | G06F 9/5077 |
| | | | | 718/104 |
| 8,509,788 B2* | 8/2013 | Natarajan | ............ | H04L 47/11 |
| | | | | 455/447 |
| 8,667,500 B1* | 3/2014 | Ji | ............... | G06F 9/5077 |
| | | | | 718/102 |
| 8,843,933 B1* | 9/2014 | Holler | ............... | G06F 9/45533 |
| | | | | 718/104 |
| 8,959,367 B2* | 2/2015 | Brown | ............... | G06F 1/3234 |
| | | | | 713/300 |
| 9,106,591 B2* | 8/2015 | Klots | ............... | G06F 17/30566 |
| 9,158,668 B2* | 10/2015 | Ashok | ............... | G06F 12/02 |
| 9,262,224 B2* | 2/2016 | Koza | ............... | H04L 63/104 |
| 9,424,094 B2* | 8/2016 | Cardosa | ............... | G06F 9/5044 |
| 9,557,793 B2 | 1/2017 | Wade | | |
| 2004/0194089 A1* | 9/2004 | McCarthy | ............ | G06F 9/5011 |
| | | | | 718/100 |
| 2011/0004500 A1* | 1/2011 | Nathuji | ............... | G06F 1/3203 |
| | | | | 705/7.37 |
| 2011/0252421 A1* | 10/2011 | Vega | ............... | G06F 9/5027 |
| | | | | 718/1 |
| 2012/0131239 A1* | 5/2012 | Fuente | ............... | G06F 3/067 |
| | | | | 710/52 |
| 2013/0263117 A1* | 10/2013 | Konik | ............... | G06F 9/5077 |
| | | | | 718/1 |
| 2014/0281347 A1* | 9/2014 | Nayar | ............... | G06F 9/5077 |
| | | | | 711/173 |
| 2016/0218994 A1* | 7/2016 | Gulati | ............... | G06F 9/5061 |

OTHER PUBLICATIONS

Brian K. Wade, "Calculating Expected Maximum CPU Power Available for Use", U.S. Appl. No. 15/386,202, filed Dec. 21, 2016.

* cited by examiner

CALCULATING EXPECTED MAXIMUM CPU POWER AVAILABLE FOR USE

BACKGROUND

The disclosure relates generally to dispensing central processing unit (CPU) time in a multi-programmed computing system, and more specifically, to a calculation technique by which any partition of a multi-programmed computing system calculates an amount of CPU power in which that partition would be able to acquire from the multi-programmed computing system, had that partition tried to acquire as much CPU power as the multi-programmed computing system would allow.

In general, a supervisor of a multi-programmed computing system (e.g., such as the IBM System z PR/SM hypervisor or the z/VM Control Program) executes a plurality of dispatchable units, which are referred herein as partitions. Associated with each partition is a weight (e.g., expression of relative importance), which expresses how the supervisor should divide or parcel out the CPU power among partitions when CPU power available for dispensing is constrained (e.g., when a state of the multi-programmed computing system is constrained). Yet, present mechanisms of the multi-programmed computing system are unable to account for situations such as when several partitions are under-consuming or when one single partition has very high demand for CPU power and is therefore over-consuming very heavily. Thus, the present mechanisms enable a given partition of a plurality of partitions to make incorrect (i.e., insufficiently aggressive) configuration or provisioning decisions with respect to acquiring CPU power.

SUMMARY

According to one embodiment of the present invention, a method of calculating a processing power available from a supervisor of a multi-programmed computing system by a first partition of a plurality of partitions, comprises: collecting, by the first partition, state data from the supervisor, the state data including a processing capacity of the multi-programmed computing system; initializing, by the first partition, a remaining capacity variable to the processing capacity of the multi-programmed computing system; initializing, by the first partition, variables, including setting a binary variable to a first logic value for each of the plurality of partitions; iteratively computing, by the first partition, an entitlement and amount of power to award for each of the plurality of partitions having their respective binary variables set to the first logic value; and requesting, by the first partition, the processing power from the supervisor, based on the iterative computation.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
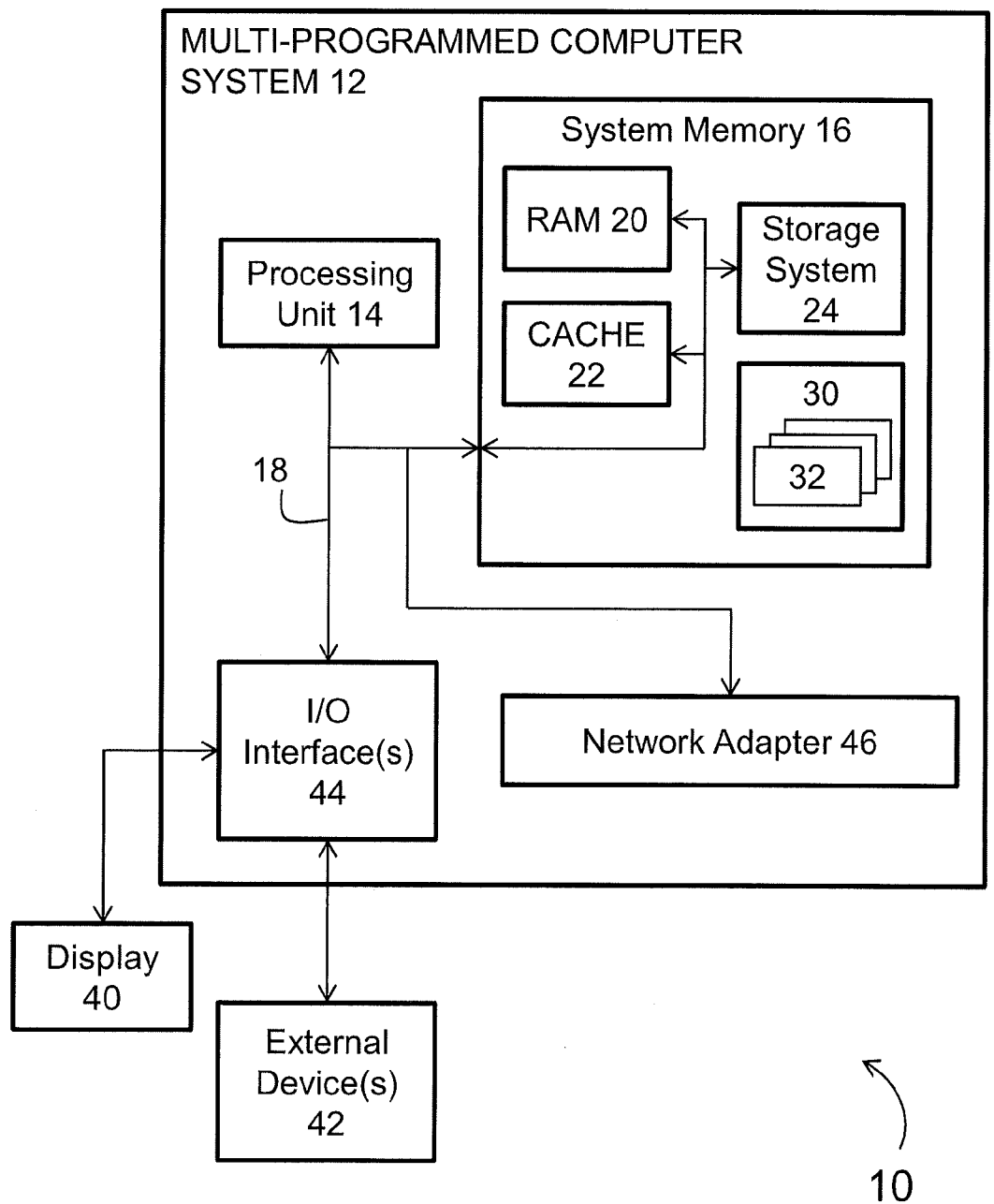
FIG. 1 illustrates a multi-programmed computing system.

As indicated above, present mechanisms enable a given partition of a plurality of partitions to make incorrect (i.e., insufficiently aggressive) configuration or provisioning decisions.

Thus, what is needed is an iterative calculation technique by which any partition of a multi-programmed computing system calculates an amount of CPU power it would be able to acquire from the multi-programmed computing system. In this regard, the iterative calculation technique embodies the notion of excess share distribution, where supervisors distribute power in accordance with entitlements. For example, a supervisor of the multi-programmed computing system starts with a total CPU power available and distributes to every partition a respective CPU power entitlement or requested CPU power amount, whichever is less, which makes the distributed CPU power less than the total power available. Once the supervisor has so distributed power to every partition (e.g., the distributed CPU power), a remaining CPU power of the total CPU power available is unutilized (a.k.a. excess CPU power) until another partition requests more power. In this way, any partition may utilize the iterative calculation technique to recalculate that partition's entitlement (e.g., an amount of CPU power it would be able to acquire from the multi-programmed computing system), thereby acquiring any amount of the remaining CPU power. Thus, the presented calculation technique calculates what the principle of excess share distribution would have done had the calculating partition exhibited infinite demand for power.

In general, embodiments of the present invention disclosed herein may include a multi-programmed computing system, method, and/or computer program product (herein referred to as the multi-programmed computing system) that gathers and utilizes state data in an iterative calculation technique to calculate how a supervisor would have distributed CPU power at a present moment, had a calculating partition exhibited infinite demand while demands by other partitions were as reflected in consumptions provided in the gathered state data. For instance, a state of the multi-programmed computing system, at any moment in time, is characterized with respect to a dispensing of CPU power of the system by a total CPU power available, e.g., an amount of CPU power available for dispensing, weights of the partitions, and actual CPU consumptions. The state is constrained when the sum of the demands of CPU power by a plurality of partitions is equal to the total CPU power available for dispensing. In turn, the supervisor divides or parcels out the CPU power among the plurality of partitions proportionally to their weights (e.g., in equal amounts when their weights are equal and when their demands for the CPU power are equal). To divide or parcel out the CPU power, the weights of the partitions are converted into entitlements for CPU power. An entitlement for CPU power is expressed according to the following formula: $E = C*W/S$, where $E$ is a partition's entitlement, $C$ is a total CPU capacity available to dispense, W is a weight of a partition, and S is a sum of the weights of the partitions to which power is being dispensed.

Yet, in the multi-programmed system some of the plurality of partitions might not be consuming their entitlements (e.g., under-consuming), while other might be consuming beyond their entitlements (e.g., over-consuming). Over-consuming is possible because supervisors hold back partitions from consuming CPU power only when available CPU power is constrained (e.g., only when there is not enough CPU power to satisfy all demands by the partitions). In these situations, over-consuming partitions are held back, while under-consuming partitions are allowed to consume up to their entitlements.

At a given moment, a given partition of the plurality of partitions may be interested in how much CPU power the given partition could consume if the given partition wanted as much CPU power as the supervisor would let it consume. The answer to this question is not an entitlement of the given partition, because at said given moment, zero or more partitions may be under-consuming while zero or more partitions may be over-consuming. The answer is relevant to the given partition, because the given partition can make valuable decisions about the given partition's actions or configuration depending upon how much CPU power would be available to the given partition if the given partition but wanted to consume the available CPU power.

One computation technique for determining 'how much CPU power the given partition could consume if the given partition wanted as much CPU power as the supervisor would let it consume' is as follows:

the given partition through an application programmable interface obtains from the supervisor the state of the multi-programmed computing system, which includes an available power (e.g., capacity), a plurality of partitions, a plurality of weights (each being respective to one of the plurality of partitions), and actual CPU consumptions of the plurality of partitions;

the given partition then utilizes the capacity (C) and the plurality of weights to calculate entitlements of the plurality of partitions;

the given partition then utilizes each computed entitlement for each partition to triage its respective actual CPU consumption into entitled and unentitled consumptions. For example, if a partition has entitlement 85% but is consuming 155%, its entitled consumption is 85% and its unentitled consumption is 70%. In this context, a partition exhibiting nonzero unentitled consumption (in other words, consuming beyond its entitlement) is said to be an overeater;

the given partition then sums (EPU) the entitled consumptions, including for the given partition its entitlement instead of an actual entitled consumption of the given partition;

the given partition then calculates the amount of excess power (XP) available on the system, according to the formula: $XP=C-EPU$;

the given partition then calculates a sum (SOEW) of the weights of the partitions that are overeating, including for the given partition its weight whether or not the given partition is truly overeating;

the given partition then calculates a weight-fraction (WXP) of the amount of excess power for that given partition, according to the formula: $WXP=XP*(W/SOEW)$, where W is the weight of the given partition;

the given partition then sums the unentitled consumptions of the overeaters, excluding any overeating the given partition might be doing (e.g., "sum of other overeaters' overeating" (SOOO)); and the given partition then calculates a value for the excess CPU power (XPF), according to the formula: $XPF=\max(WXP, XP-SOOO)$.

Thus, the excess CPU power (e.g., power beyond the entitlement of the given partition) is the CPU power the given partition could expect to get under the present circumstances (e.g., under the present state of the multi-programmed computing system). Further, the total CPU power the given partition could expect to get would be the calculated excess CPU power plus the entitlement of the given partition.

Yet, this computation technique fails to predict in this scenario when the given partition were to want a high amount of CPU power, because the supervisor would let the given partition compete with that other heavy overeater for excess CPU power according to the ratios of their weights. The net result of this failure in the computation technique is that the given partition will under-predict the total CPU power it could get under such circumstances.

Referring now to FIG. 1, a schematic of an example of a computing environment 10 is illustrated. The computing environment 10 includes a multi-programmed computing system 12, which is operational with numerous other general purpose or special purpose computing system environments or configurations. In operation, the multi-programmed computing system 12 utilizes a supervisor to execute a plurality of partitions (as further described below), where each partition employs an iterative calculation technique by which that partition calculates an amount of CPU power it would be able to acquire from the multi-programmed computing system 12, in place of the above computation technique.

Computing environment 10 is only one example and is not intended to suggest any limitation as to the scope of use or operability of embodiments of the invention described herein. Regardless, computing environment 10 is capable of being implemented and/or performing any of the operability set forth hereinabove. Examples of well-known computing systems, environments, and/or configurations that may be suitable for use with multi-programmed computing system 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Multi-programmed computing system 12 may be described in the general context of computer system executable instructions, such as program modules, being executed by a computer system. Generally, program modules may include routines, programs, objects, components, logic, data structures, and so on that perform particular tasks or implement particular abstract data types. Multi-programmed computing system 12 may be practiced in distributed computing environments where tasks are performed by remote processing devices that are linked through a communications network. In a distributed computing environment, program modules may be located in both local and remote computer system storage media including memory storage devices.

As shown in FIG. 1, the multi-programmed computing system 12 in the computing environment 10 is shown in the form of a general-purpose computing device. The components of multi-programmed computing system 12 may include, but are not limited to, one or more processors or processing units 14, a system memory 16, and a bus 18 that couples various system components including system memory 16 to processing unit 14.

The processing unit 14 may include any processing hardware, software, or combination of hardware and software utilized by the multi-programmed computing system 12 that carries out the computer readable program instructions by performing arithmetical, logical, and/or input/output operations. Examples of the processing unit 14 include, but are not limited to an arithmetic logic unit, which performs arithmetic and logical operations; a control unit, which extracts, decodes, and executes instructions from a memory; and an array unit, which utilizes multiple parallel computing elements.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Multi-programmed computing system 12 typically includes a variety of computer system readable media. Such media may be any available media that is accessible by the multi-programmed computing system 12, and it includes both volatile and non-volatile media, removable and non-removable media.

System memory 16 can include a tangible device that retains and stores computer readable program instructions for use by the processing unit 14 of the multi-programmed computing system 12. For instance, the memory 16 can include computer system readable media in the form of volatile memory, such as random access memory (RAM) 20 and/or cache memory 22. Multi-programmed computing system 12 may further include other removable/non-removable, volatile/non-volatile computer system storage media.

By way of example only, storage system 24 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 16 may include at least one program product having a set (e.g., at least one) of program modules that are configured to carry out the operations of embodiments of the invention.

Program/utility 30 (e.g., a supervisor), having a set (at least one) of program modules 32 (e.g., a partition), may be stored in memory 16 by way of example, and not limitation, as well as an operating system, one or more application programs, other program modules, and program data. Each of the operating system, one or more application programs, other program modules, and program data or some combination thereof, may include an implementation of a networking environment. Program modules 32 generally carry out the operations and/or methodologies of embodiments of the invention as described herein.

Multi-programmed computing system 12 may also communicate with one or more external devices 40 such as a keyboard, a pointing device, a display 42, etc.; one or more devices that enable a user to interact with multi-programmed computing system 12; and/or any devices (e.g., network card, modem, etc.) that enable multi-programmed computing system 12 to communicate with one or more other computing devices. Such communication can occur via Input/Output (I/O) interfaces 44.

The I/O interfaces 44 may include a physical and/or virtual mechanism utilized by the multi-programmed computing system 12 to communicate between elements internal and/or external to the multi-programmed computing system 12. That is, the I/O interfaces 44 may be configured to receive or send signals or data within or for the multi-programmed computing system 12. An example of the I/O interfaces 44 may include a network adapter card or network interface configured to receive computer readable program instructions from a network and forward the computer readable program instructions, original records, or the like for storage in a computer readable storage medium (e.g., system memory 16) within the respective computing/processing device (e.g., the multi-programmed computing system 12).

Still yet, the multi-programmed computing system 12 can communicate with one or more networks such as a local area network (LAN), a general wide area network (WAN), and/or a public network (e.g., the Internet) via network adapter 46. As depicted, network adapter 46 communicates with the other components of multi-programmed computing system 12 via bus 18. It should be understood that although not shown, other hardware and/or software components could be used in conjunction with the multi-programmed computing system 12. Examples, include, but are not limited to: microcode, device drivers, redundant processing units, external disk drive arrays, RAID systems, tape drives, and data archival storage systems, etc.

The computing environment 10 and elements therein may take many different forms and include multiple and/or alternate components and facilities. That is, while the computing environment 10 is shown in FIG. 1, the components illustrated in FIG. 1 are not intended to be limiting. Indeed, additional or alternative components and/or implementations may be used.

Figure 2:
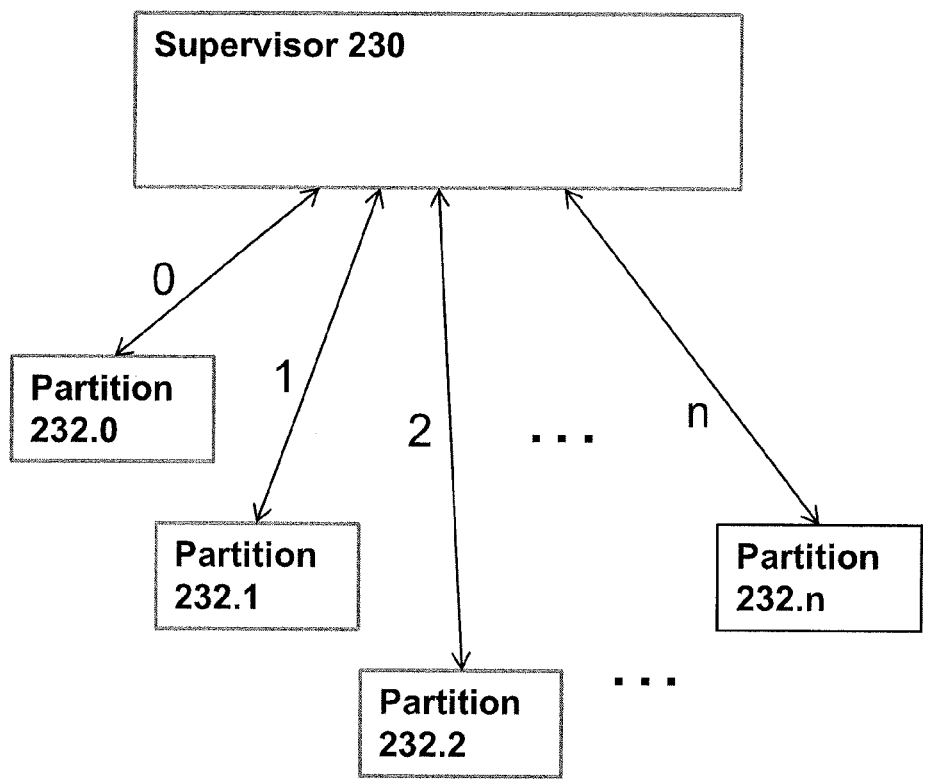
FIG. 2 illustrates communications between components of a multi-programmed computing system.

FIG. 2 illustrates an example of a program/utility 30 (e.g., a supervisor 230) in communication with a set of program modules 32 (e.g., partitions 232) operating within a memory 16 (e.g., memory 216).

The supervisor 230 includes computer readable program instructions configured to control the execution of processing routines, and/or regulate scheduling, I/O operations, error actions, along with regulating a flow of work in the multi-programmed computing system 12. The supervisor 230 may also allocate component space and schedule events by task queuing and system interrupts so that demands on the supervisor 230 are met.

Each partition 232 is a consumer of CPU power or time that includes computer readable program instructions configured to gathers and utilizes state data in an iterative calculation technique to calculate how the supervisor 230 would distributed CPU power at a present moment, had a local partition exhibited infinite demand while demands by other partitions were as reflected in consumptions provided in the gathered state data (as further described below). As illustrated in FIG. 2, the memory 216 includes a plurality of partitions 232, illustrated as partition 232.0 to partition 232.$n$, where 'n' is an integer representing a total number of partitions 232 (similarly, the communications between the partitions 232.0 to partition 232.$n$ with the supervisor 230 are represented by the Arrows 0-N respectively). Although one exemplary numbering sequence for the partitions 232 is offered, it should be understood that the same operability may be provided using fewer, greater, or differently implemented sequences.

While a single item is illustrated for the multi-programmed computing system 12 (and other items) by FIGS. 1-2, these representations are not intended to be limiting and thus, the multi-programmed computing system 12 items may represent a plurality of items. In addition, although one item breakdown of the multi-programmed computing system 12 is offered, it should be understood that the same operability may be provided using fewer, greater, or differently named items. Although it is not specifically illustrated in the figures, the multi-programmed computing system 12 may further include a user interface module and an application programmable interface module; however, these modules may be integrated with any of the above named items. A user interface module may include computer readable program instructions configured to generate and mange user interfaces that receive inputs and present outputs. An application programmable interface module may include computer readable program instructions configured to specify how other modules, applications, devices, and systems interact with each other.

Figure 3:
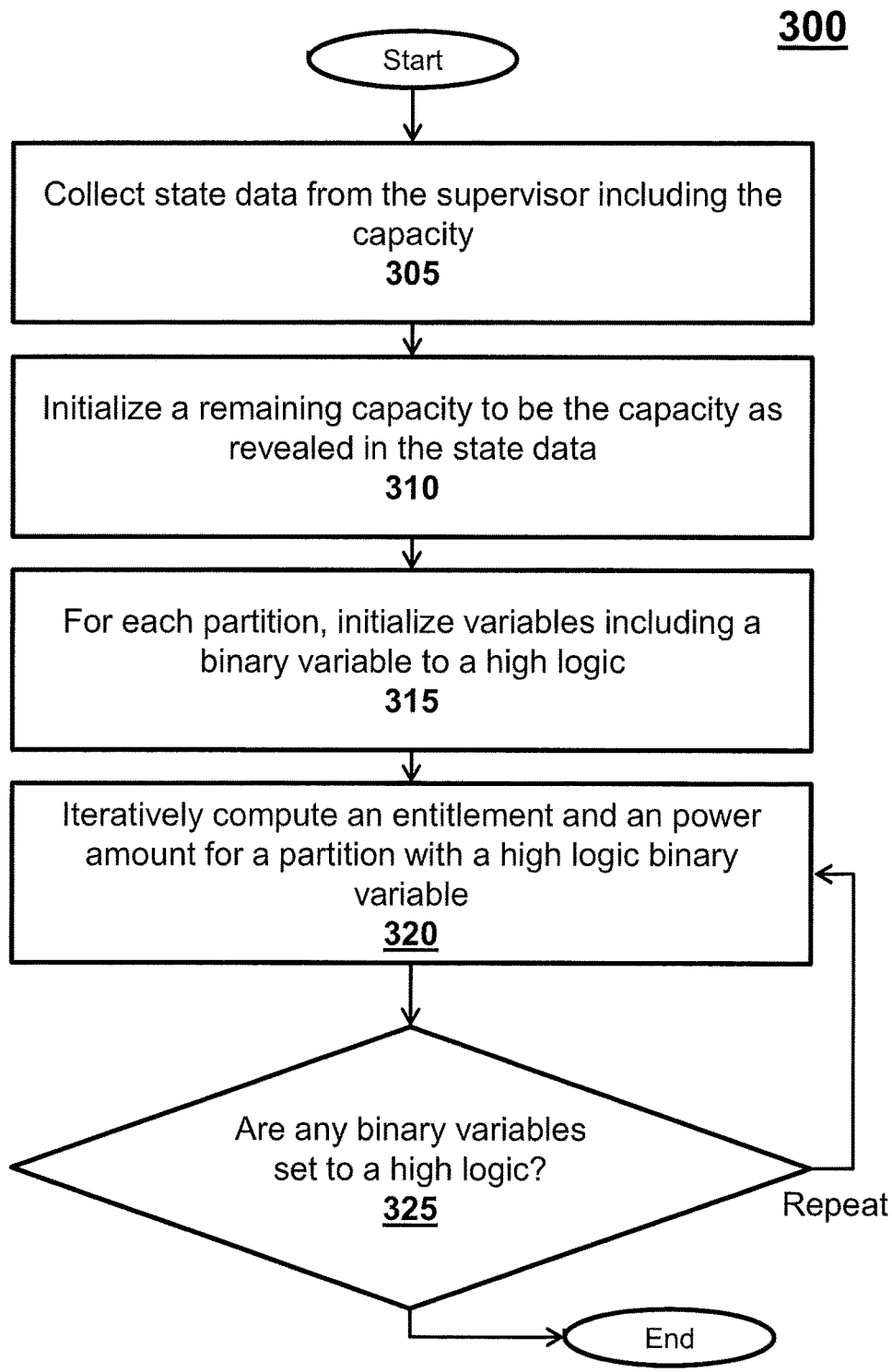
FIG. 3 illustrates a process flow of a multi-programmed computing system.

The multi-programmed computing system 12 will be described with reference to FIG. 3. FIG. 3 illustrates a process flow of a calculation technique of the multi-programmed computing system 12 where a given partition (e.g., partition 232.0) iteratively calculates how the supervisor 230 would distribute CPU power at a present moment, had the partition 232.0 exhibited infinite demand while demands by other partitions 232.1-232.$n$ were as reflected in consumptions provided in the gathered state data.

The process 300 begins at block 305 when the partition 232.0 (via Arrow 0) collects state data from the supervisor 230. The state data from the supervisor 230 includes a capacity (C) of the multi-programmed computing system 12, a plurality of weights with each weight corresponding to one of the partitions 232, and a plurality of consumption values with each value corresponding to a consumption amount by one of the partitions 232 of the capacity by one of the partitions 232.

Next, the process 300 proceeds to block 310 where a single variable (e.g., remaining capacity (RC)) is initialized by the partition 232.0 to be the capacity C as revealed in the collected state data. Then, at block 315, for each partition 232, the following variables are initialized by the partition 232.0: a remaining need (RN) to an initial value corresponding to an actual consumption as revealed in the collected state data; a power given (PG) to an initial value of zero; and a binary variable (PLAYING) to an initial logic value (e.g., to a high or low logic). The process 300 proceeds to block 320, which may be looped or repeated as further described below.

At block 320, the partition 232.0 computes a sum of the weights of the partitions (SOPW) for each partition 232 with the binary variable set to a first logic value (PLAYING=1). Then, the given partition makes a temporary copy of remaining capacity (RC) into a variable (e.g., temporary remaining capacity (TRC)). Next, for each partition 232.0-232.$n$ with a respective binary variable set to the first logic value (PLAYING=1), an entitlement (E) and an amount of power (A) to award to that partition is calculated.

For instance, since the partition 232.0 has a respective binary variable set to the first logic value, the respective entitlement is calculated by the partition 232.0 based on dividing the product of the remaining capacity and that partition's weight (W) as revealed in the collected state data by the respective sum of the weights of the partitions (e.g., according to the equation: E=RC*W/SOPW). Further, an amount of power (A) to award to the partition 232.0 is calculated by the partition 232.0 according to the following logic: for the partition that is doing the calculating (e.g., partition 232.0—which is the case in this iteration), then A=E; for partitions that are infinitely entitled (as is the supervisor 230 itself, which consumes power for its own purposes and which also appears in the collected state data), then A=RN; and for partitions that are not infinitely entitled or doing the calculating, then A=min (RN, E). Then, the partition 232.0 computes the amount of power to award itself based on a minimum value of the temporary remaining capacity (e.g., according to the equation A=min (A, TRC)). Next, the partition 232.0 updates the variables based on the computed amount of power (e.g., according to the equations PG=PG+A; RN=RN−A; and TRC=TRC−A). At this point, if RN<=0, the partition 232.0 sets the binary variable to a second logic value (PLAYING=0). Then at decision block 325, the partition 232.0 checks to see other partitions have a binary variable set to the first logic value. In this example, since the partition 232.1 has a respective binary variable set to the first logic value, the respective entitlement is calculated by the partition 232.0 based on dividing the product of the remaining capacity and that partition's weight (W) as revealed in the collected state data by the respective sum of the weights of the partitions (e.g., according to the equation: E=RC*W/SOPW). Further, an amount of power (A) to award to the partition 232.1 is calculated by the partition 232.0 according to the logic above. Thus, because the partition 232.1 is not infinitely entitled nor doing the calculation, then A=min (RN, E). Then, the partition 232.0 computes the amount of power to award itself based on a minimum value of the temporary remaining capacity (e.g., according to the equation A=min (A, TRC)). Next, the partition 232.0 updates the variables based on the computed amount of power (e.g., according to the equations PG=PG+A; RN=RN−A; and TRC=TRC−A). Then, if RN<=0, the partition 232.0 sets the binary variable of the partition 232.1 to the second logic value (PLAYING=0) and moves onto the next partition with the binary variable set to the first logic value. In addition, these block 320 operations are repeated unless, at decision block 325, TRC=RC or TRC<m, where m is some very small positive number, such as 0.01 (e.g., when there is no power left or no more partitions want additional power).

When this calculation technique terminates, the partition 232.0 would request and receive the CPU power from the supervisor in accordance with the remaining capacity collected from the state data. In turn, it will be true that for every partition 232, the corresponding variable power given will contain the amount of CPU power the supervisor 230 would have awarded, if it had been true that the calculating partition 232.0 exhibited infinite demand and the other partitions 232.1-232.$n$ had not changed their respective exhibited demands.

Thus, the calculation technique embodies the notion of excess share distribution, where supervisors distribute power in accordance with entitlements. That is, supervisors do so as follows: start with the total power available; give to every partition its entitlement or the remaining amount it needs, whichever is less; when the supervisor has so given to every partition, it still has some power left to give; recalculate the entitlements according to which partitions still want power; return to giving every partition its entitlement or the remaining amount it needs, unless there is no power left to give away or no partitions want any more power. Therefore, the presented calculation technique calculates what the principle of excess share distribution would have done had the calculating partition exhibited infinite demand for power.

Systems and/or computing devices, such as the multi-programmed computing system (e.g., the multi-programmed computing 12), may employ any of a number of computer operating systems, including, but by no means limited to, versions and/or varieties of the AIX UNIX operating system distributed by International Business Machines of Armonk, N.Y., the Microsoft Windows operating system, the Unix operating system (e.g., the Solaris operating system distributed by Oracle Corporation of Redwood Shores, Calif.), the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, a notebook, a laptop, a network device, a handheld computer, or some other computing system and/or device.

In general, computing devices may include a processor (e.g., processing unit 14) and a computer readable storage medium (e.g., system memory 16), where the processor receives computer readable program instructions, e.g., from the computer readable storage medium, and executes these instructions, thereby performing one or more processes, including one or more of the processes described herein (e.g., employing a calculation technique via an iterative calculation technique, by which any partition of a multi-programmed computing system calculates an amount of CPU power it would be able to acquire from the multi-programmed computing system).

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a computing device, partly on the computing device, as a stand-alone software package, partly on a local computing device and partly on a remote computer device or entirely on the remote computer device. In the latter scenario, the remote computer may be connected to the local computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Computer readable program instructions described herein may also be downloaded to respective computing/processing devices from a computer readable storage medium or to an external computer or external storage device via a network (e.g., any combination of computing devices and connections that support communication). For example, a network may be the Internet, a local area network, a wide area network and/or a wireless network, comprise copper transmission cables, optical transmission fibers, wireless transmission, routers, firewalls, switches, gateway computers and/or edge servers, and utilize a plurality of communication technologies, such as radio technologies, cellular technologies, etc.

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Thus, system and method and/or elements thereof may be implemented as computer readable program instructions on one or more computing devices, stored on computer readable storage medium associated therewith. A computer program product may comprise such computer readable program instructions stored on computer readable storage medium for carrying and/or causing a processor to carry out the operations of system and method.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the Figures illustrate the architecture, operability, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the figures. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of calculating a processing power available from a supervisor of a multi-programmed computing system by a first partition of a plurality of partitions, the method comprising:
    collecting, by the first partition, state data from the supervisor, the state data including a processing capacity of the multi-programmed computing system;
    initializing, by the first partition, a remaining capacity variable to the processing capacity of the multi-programmed computing system;
    initializing, by the first partition, variables, including setting a binary variable to a first logic value for each of the plurality of partitions;
    iteratively computing, by the first partition, an entitlement and amount of power to award for each of the plurality of partitions having their respective binary variables set to the first logic value;
    requesting, by the first partition, the processing power from the supervisor, based on the iterative computation; and
    receiving, by the first partition, the processing power from the supervisor based on the requesting.

2. The method of claim 1, wherein the state data includes:
    a plurality of weights, each weight corresponding to one of the plurality of partitions; and
    a plurality of consumption values, each consumption value corresponding to a consumption amount by one of the plurality of partitions.

3. The method of claim 1, wherein the variables for each of the remaining plurality of partitions include a remaining need, a power given, and the binary variable, and
    wherein the remaining need is initialized to a value corresponding to an actual consumption identified within the collected state data and the power given is initialized to a value of zero.

4. The method of claim 1, wherein the iterative computing of the entitlement and the amount of power to award for each of the plurality of partitions with their respective binary variables set to the first logic value further comprising:
    updating, by the first partition, a power given, a remaining need, and a temporary remaining capacity based on the computed amount of power corresponding to the first partition.

5. The method of claim 1, wherein the entitlement is calculated by the first partition based on dividing a product of the remaining capacity and a weight of that partition as revealed in the state data by the sum of the weights of the partitions.

6. The method of claim 1, wherein the amount of power is calculated by the first partition for a current partition of the plurality of partitions according to the following logic:
    if the current partition is the first partition, then the amount of power to award to the current partition is equal to the entitlement;
    if the current partition is infinitely entitled, then the amount of power to award to the current partition is equal to a remaining need of the infinitely entitled current partition; and
    if the current partition is neither infinitely entitled nor the first partition, then the amount of power to award to the current partition is equal to a minimum value of the entitlement with respect to a remaining need of the neither infinitely entitled nor the first partition current partition.

7. A computer program product, the computer program product comprising a computer readable storage medium having program instructions for calculating a processing power available from a supervisor of a multi-programmed computing system embodied therewith, the program instructions executable by a processor implemented first partition of a plurality of partitions to cause:

collecting, by the first partition, state data from the supervisor, the state data including a processing capacity of the multi-programmed computing system;

initializing, by the first partition, a remaining capacity variable to the processing capacity of the multi-programmed computing system;

initializing, by the first partition, variables, including setting a binary variable to a first logic value for each of the plurality of partitions;

iteratively computing, by the first partition, an entitlement and amount of power to award for each of the plurality of partitions having their respective binary variables set to the first logic value;

requesting, by the first partition, the processing power from the supervisor, based on the iterative computation; and receiving, by the first partition, the processing power from the supervisor based on the requesting.

8. The computer program product of claim 7, wherein the state data includes:

a plurality of weights, each weight corresponding to one of the plurality of partitions; and a plurality of consumption values, each consumption value corresponding to a consumption amount by one of the plurality of partitions.

9. The computer program product of claim 7, wherein the variables for each of the remaining plurality of partitions includes a remaining need, a power given, and the binary variable, and wherein the remaining need is initialized to a value corresponding to an actual consumption identified within the collected state data and the power given is initialized to a value of zero.

10. The computer program product of claim 7, wherein the iterative computing of the entitlement and the amount of power to award for each of the plurality of partitions with their respective binary variables set to the first logic value further comprising:

updating, by the first partition, a power given, a remaining need, and a temporary remaining capacity based on the computed amount of power corresponding to the first partition.

11. The computer program product of claim 7, wherein the entitlement is calculated by the first partition based on dividing a product of the remaining capacity and a weight of that partition as revealed in the state data by the sum of the weights of the partitions.

12. The computer program product of claim 7, wherein the amount of power is calculated by the first partition for a current partition of the plurality of partitions according to the following logic:

if the current partition is the first partition, then the amount of power to award to the current partition is equal to the entitlement;

if the current partition is infinitely entitled, then the amount of power to award to the current partition is equal to a remaining need of the infinitely entitled current partition; and if the current partition is neither infinitely entitled nor the first partition, then the amount of power to award to the current partition is equal to a minimum value of the entitlement with respect to a remaining need of the neither infinitely entitled nor the first partition current partition.

13. A multi-programmed computing system including a supervisor and a processor implemented first partition of a plurality of partitions, the first partition configured to:

collect state data from the supervisor, the state data including a processing capacity of the multi-programmed computing system;

initialize a remaining capacity variable to the processing capacity of the multi-programmed computing system;

initialize variables including setting a binary variable to a first logic value for each of the plurality of partitions;

iteratively compute an entitlement and amount of power to award for each of the plurality of partitions with their respective binary variables set to the first logic value;

request the processing power from the supervisor based on the iterative computation; and receiving the processing power from the supervisor based on the requesting.

14. The multi-programmed computing system of claim 13, wherein the state data includes:

a plurality of weights, each weight corresponding to one of the plurality of partitions; and a plurality of consumption values, each consumption value corresponding to a consumption amount by one of the plurality of partitions.

15. The multi-programmed computing system claim 13, wherein the variables for each of the remaining plurality of partitions includes a remaining need, a power given, and the binary variable, and wherein the remaining need is initialized to a value corresponding to an actual consumption identified within the collected state data and the power given is initialized to a value of zero.

16. The multi-programmed computing system of claim 13, wherein the iterative computation of the entitlement and the amount of power to award for each of the plurality of partitions with their respective binary variables set to the first logic value further comprising:

updating, by the first partition, a power given, a remaining need, and a temporary remaining capacity based on the computed amount of power corresponding to the first partition.

17. The multi-programmed computing system of claim 13, wherein the entitlement is calculated by the first partition based on a division of a product of the remaining capacity and a weight of that partition as revealed in the state data by the sum of the weights of the partitions.

18. The multi-programmed computing system of claim 13, wherein the amount of power is calculated by the first partition for a current partition of the plurality of partitions according to the following logic:

if the current partition is the first partition, then the amount of power to award to the current partition is equal to the entitlement;

if the current partition is infinitely entitled, then the amount of power to award to the current partition is equal to a remaining need of the infinitely entitled current partition; and if the current partition is neither infinitely entitled nor the first partition, then the amount of power to award to the current partition is equal to a minimum value of the entitlement with respect to a remaining need of the neither infinitely entitled nor the first partition current partition.

\* \* \* \* \*